United States Patent [19]
Kobayashi

[11] Patent Number: 5,739,892
[45] Date of Patent: Apr. 14, 1998

[54] EYEGLASSES FRAME

[76] Inventor: Mitsuo Kobayashi, 6-9 Ebata-cho, Fukui-shi, Fukui-ken, 918, Japan

[21] Appl. No.: 787,470

[22] Filed: Jan. 22, 1997

[51] Int. Cl.⁶ .................................................. G02C 5/22
[52] U.S. Cl. .................................. 351/153; 16/228
[58] Field of Search ........................... 351/111, 119, 351/121, 153; 16/228

[56] References Cited

U.S. PATENT DOCUMENTS

| | | | |
|---|---|---|---|
| 4,243,305 | 1/1981 | Elder | 351/153 |
| 4,844,606 | 7/1989 | Smith | 351/153 |
| 5,596,789 | 1/1997 | Simioni | 351/153 |

*Primary Examiner*—Huy Mai
*Attorney, Agent, or Firm*—Nikaido, Marmelstein, Murray & Oram LLP

[57] ABSTRACT

Disclosed is an improved eyeglasses frame structure whose articulated joint between the temple and the front can be formed without recourse to soldering, and therefore, such eyeglasses frame structure is advantageous to the making of frames of metals or alloys of poor solderability. For example each temple has a pivot axle bent and rising from its front end. A joint piece is connected to each rim or lens, and has a pivot hole made at its intermediate portion. The temple is pivotally connected to the joint piece by inserting the pivot axle of the temple in the pivot hole of the joint piece. The temple can be opened until it abuts the upright end of the joint piece to be held in alignment with the joint piece. Thanks to no soldering required frames can be made at an increased efficiency.

3 Claims, 2 Drawing Sheets

EYEGLASSES FRAME

BACKGROUND OF THE INVENTION

1. Field of the Invention

The present invention relates to an eyeglasses frame, and more particularly to a temple-to-front hinge joint of the eyeglasses frame.

2. Description of Related Art

A conventional temple-to-front hinge joint uses a hinge of which one hinge piece is soldered to the rear end of the joint piece of each rim of the front and the other hinge piece is soldered to the front end of the temple.

The soldering, however, requires skillful, time-consuming work. Particularly in articulating fine temples to fronts, very small hinges must be used. Such minute hinges cannot be made with ease, and disadvantageously areas available for soldering are very small, and therefore, soldering is very difficult. Still disadvantageously the bearing of the hinge is so thin and fragile that hinges are liable to be broken therearound.

Recently there has been an increasing demand for frames of titanium alloys, aluminum, super resilient materials such as nickel-titanium alloys and other special metals that require a special coating process prior to the soldering, which must be effected in a special atmosphere.

SUMMARY OF THE INVENTION

In view of the above one object of the present invention is to provide an improved temple-to-front articulated joint guaranteed free of such problems as described above.

To attain this object an eyeglasses frame comprising a front and two temples hinged to the opposite sides of the front is improved according to the present invention in that each temple is pivotally connected to an associated joint piece, which is connected to each lens or rim of the front, thus permitting the temple to fold on the front, one of said joint piece and said temple having a bearing integrally connected thereto, said bearing having a through hole or blind hole and a resin hollow plug press-fitted in the through hole or blind hole, thus providing the bearing hole, the other of said joint piece and said temple having a pivot axle integrally connected thereto, said pivot axle being inserted in the bearing hole, said joint piece having an abutment to hold the temple in its opening position relative to the front.

The hollow plug may comprise a hollow cylinder having an annular collar integrally connected to the circumference of one end of the hollow cylinder, which annular collar is pressed against the circumference of the hole of the bearing when pushing the hollow cylinder in the hole of the bearing, so that the pivot axle of the temple may be press-fitted in the hollow plug of the bearing.

The pivot axle may have an antislip piece for gripping the end length of said pivot axle appearing from the bearing hole.

In use each temple rotates about its pivot axle until it abuts on the abutment of the joint piece, thus being kept open to its extremity.

The pivot axle of the temple is prevented positively from slipping off from the bearing hole by the antislip piece, which grips the end of the pivot axle appearing from the lower surface of the bearing.

Other objects and advantages of the present invention will be understood from the following description of eyeglasses frames according to preferred embodiments of the present invention, which are shown in accompanying drawings.

DESCRIPTION OF THE PREFERRED EMBODIMENTS

Figure 1:
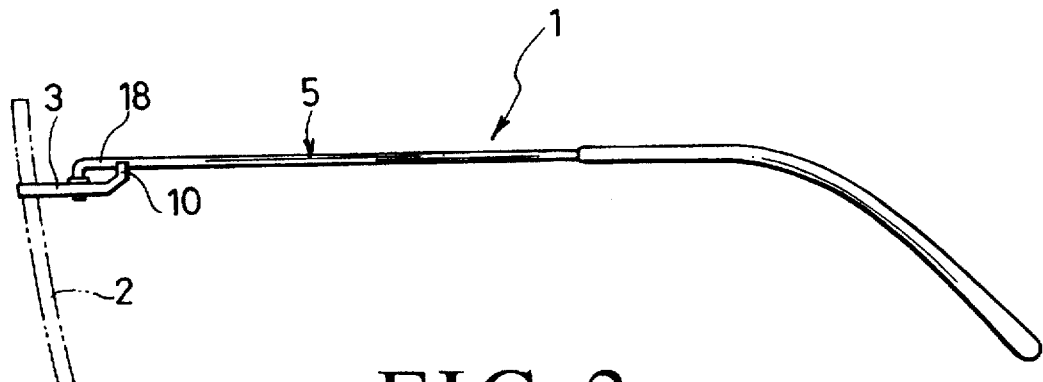
FIG. 1 is a side view of an eyeglasses using according to an embodiment of the present invention.
Figure 2:
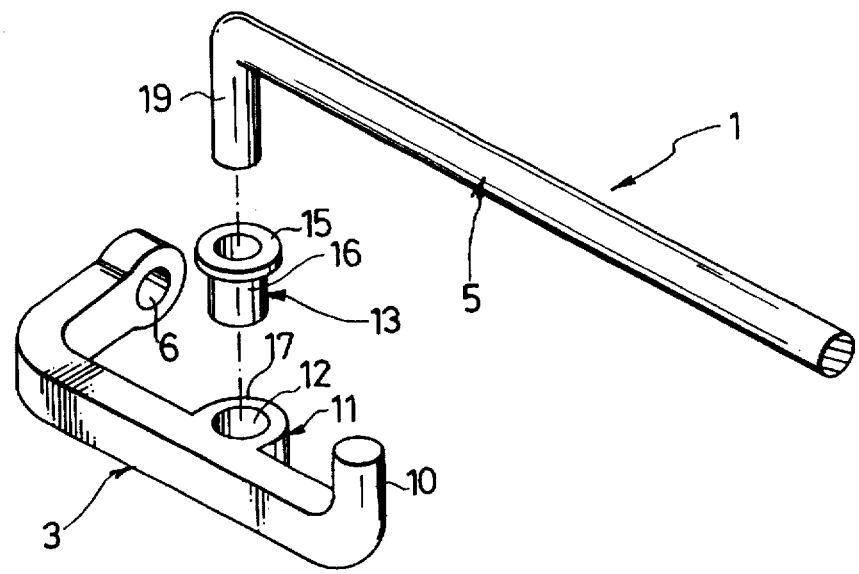
FIG. 2 is an exploded view of the temple-to-rim pivotable joint used in the frame structure.

Referring to FIGS. 1 to 4, an eyeglasses frame 1 according to an embodiment of the present invention includes a joint piece 3 connected to each lens 2, and an associated temple 5, which is pivotally connected to the end of the joint piece 3 so as to permit the temple 5 to open and fold on the front.

The joint piece 3 has a curved extension ending with an apertured end, and the joint piece 3 is fixed to the lens 2 by inserting a bolt 7 in the aperture 6 of the curved extension of the joint piece 3 and an aperture of the lens 2, and by tightening with an associated nut 8. The joint piece 3 has a abutment 10 rising from its rear end, and an inward-bulged bearing 11 at its intermediate portion. The bearing 11 has an insertion hole 12 made in the form of through hole. A hollow plug 13 of a synthetic resin such nylon comprises a hollow cylinder 16 and an annular collar 15 integrally connected to one end of the hollow cylinder 16. The hollow plug 13 is press-fitted in the insertion hole 12 until its collar 15 has abutted on the circumference of the insertion hole 12, as seen from FIG. 3. The hollow plug 13 may be fixed to the insertion hole 12 by using an adhesive. The longitudinal size of the hollow plug 13 may be long enough to appear somewhat from the lower surface of the bearing as seen from FIG. 3. This extra extension is preferable from the angle of stable holding of the pivot axle of the temple 5.

Figure 3:
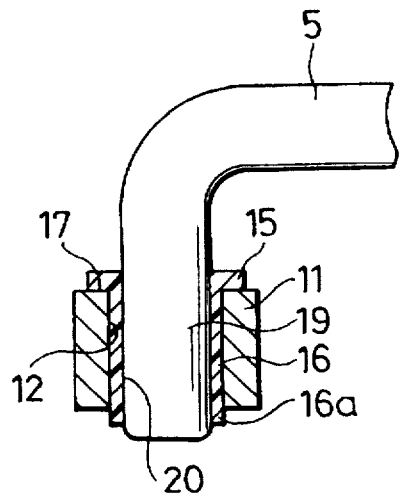
FIG. 3 is a sectional view showing details of the pivotable joint.
Figure 4:
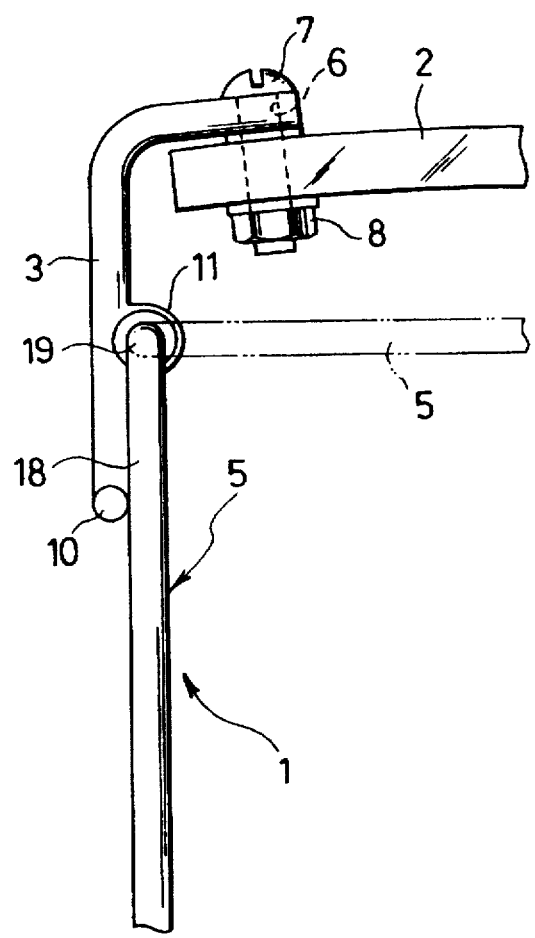
FIG. 4 shows how the temple is folded and opened.

The temple 5 has a descendent pivot axle 19 at its front end, and the pivot axle 19 is press-fitted in the bearing hole 20 as shown in FIG. 3. The temple 5 can rotate about its pivot axle with respect to the joint piece 3. As seen from FIG. 4, the temple 5 can be folded on the front as shown in phantom lines, and can be opened until it abuts on the rising abutment 10 of the joint piece 3, thus putting the temple 5 in alignment with the joint piece 3, as shown in solid lines.

Figure 5:
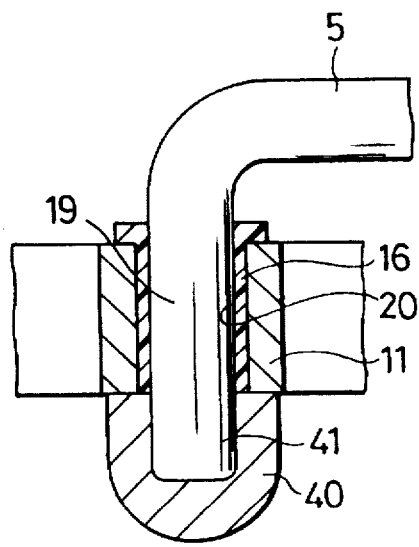
FIG. 5 is a longitudinal section showing how an antislip grips the pivot axle of the temple.
Figure 6:
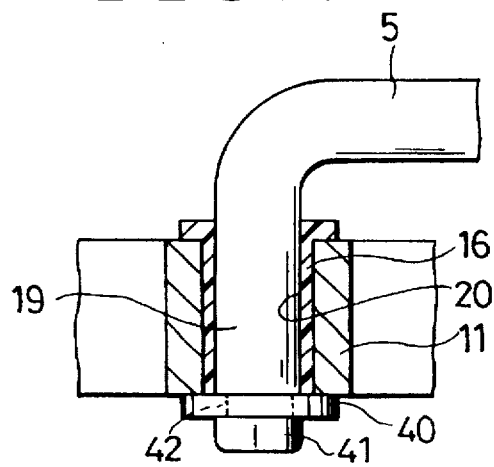
FIG. 6 is a longitudinal section showing how another antislip grips the pivot axle of the temple.

If the pivot axle is press-fitted in the pivot hole, it is difficult to remove the pivot axle from the pivot hole. If the pivot axle 19 is fixed to the pivot hole 20 by applying an antislip piece 40 to the end of the pivot axle 19 appearing from the pivot hole 20, as seen from FIG. 5, or if the pivot axle 19 is fixed to the pivot hole 20 by applying an antislip piece 40 in the form of snap ring to the circumference groove 42 of the end of the pivot axle 19 appearing from the pivot hole 20, as seen from FIG. 6, the pivot axle 19 can be positively prevented from slipping off from the pivot hole 20, still permitting removal of the pivot axle 19 from the pivot hole 20.

Figure 7:
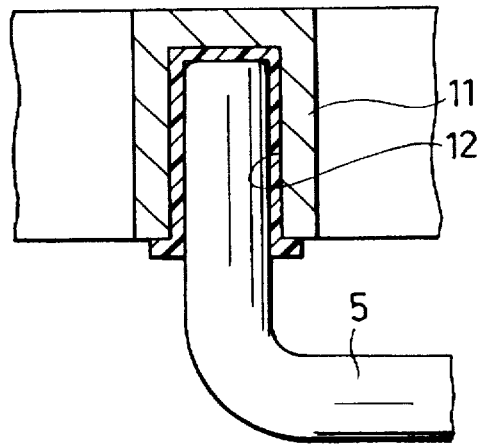
FIG. 7 is a longitudinal section showing that the pivot axle of the temple is inserted in a blind hole.

Further, the pivot hole in which the pivot axle is inserted may be a blind hole as shown in FIG. 7.

As for the hollow plug it is shown as a collared cylindrical shape, but it can be a block having an aperture. If it has a collar, it should be pushed in the pivot hole until its collar has abutted on the circumference of the pivot hole to assure that it is completely inserted in the pivot hole. Preferably the collar is thick enough to provide a substantial longitudinal extension of the hollow cylindrical size to accomodate the pivot axle, accordingly increasing the stableness with which the pivot axle can be held. Preferably the hollow plug is pushed in the pivot hole in the same direction as the pivot axle is inserted in the pivot hole as seen from FIGS. 3; when the pivot axle is inserted in the hollow plug, the pushing force can have no component to remove the hollow plug from the pivot hole.

The pivot axle can be integrally formed by press-molding other than bending.

As may be understood from the above, in an eyeglasses frame according to the present invention one of the joint piece and the temple has a pivot hole, and the other of the joint piece and the temple has a pivot axle, and therefore, the pivot joint can be provided without recourse to soldering. Accordingly frames can be assembled at an increased efficiency, and still advantageously frames can be easily made of titanium, aluminum or super resilient materials such as nickel-titanium alloys, which are difficult to be soldered.

What is claimed is:

1. An eyeglasses frame comprising a front and two temples hinged to the opposite sides of the front, each temple being pivotally connected to an associated joint piece, which is connected to each lens or rim of the front, thus permitting the temple to fold on the front;

wherein one of said joint piece and said temple having a bearing integrally connected thereto, said bearing having a through hole or blind hole and a resin hollow plug press-fitted in the through hole or blind hole, thus providing the bearing hole, the other of said joint piece and said temple having a pivot axle integrally connected thereto, said pivot axle being inserted in the bearing hole, said joint piece having an abutment to hold the temple in its opening position relative to the front.

2. An eyeglasses frame according to claim 1, wherein said hollow plug comprises a hollow cylinder having an annular collar integrally connected to the circumference of one end of the hollow cylinder, which the annular collar is pressed against the circumference of the hole of the bearing when pushing the hollow cylinder in the hole of the bearing, so that the pivot axle of the temple may be press-fitted in the hole of the hollow plug.

3. An eyeglasses frame according to claim 1 or 2, wherein said pivot axle has an antislip piece gripping the end length of said pivot axle appearing from the bearing hole.

* * * * *